United States Patent [19]

Gupta et al.

[11] Patent Number: 5,729,546
[45] Date of Patent: Mar. 17, 1998

[54] EXPANDABLE COMMUNICATION CELL BUS FOR MULTIPLEXING AND CONCENTRATING COMMUNICATION CELL TRAFFIC ONTO HIGH SPEED LINES

[75] Inventors: Amar Gupta, Cupertino; Joel Craig Naumann, Morgan Hill; Eduard Allen Price, Mountain View; Shrish K. Sathe, Cupertino, all of Calif.

[73] Assignee: Cisco Systems, Inc., San Jose, Calif.

[21] Appl. No.: 492,922

[22] Filed: Jun. 21, 1995

[51] Int. Cl.[6] .................................................. H04Q 11/00
[52] U.S. Cl. ............................ 370/434; 370/394; 370/395; 370/449
[58] Field of Search .............................. 370/56, 24, 84, 370/85.1, 85.8, 85.13, 85.7, 94.1, 94.2, 95.2, 276, 278, 282, 362, 389, 395, 431, 434, 449, 451, 462

[56] References Cited

U.S. PATENT DOCUMENTS

| | | | |
|---|---|---|---|
| 5,222,062 | 6/1993 | Sharma et al. | 370/56 |
| 5,251,209 | 10/1993 | Jurkevich et al. | 370/94.1 |
| 5,280,586 | 1/1994 | Kunz et al. | 370/56 |
| 5,375,117 | 12/1994 | Morita et al. | 370/94.1 |
| 5,430,715 | 7/1995 | Corbalis et al. | 370/395 |
| 5,602,850 | 2/1997 | Wilkinson et al. | 370/462 |

FOREIGN PATENT DOCUMENTS

WO95/08887  3/1995  WIPO ............... H04L 12/403

OTHER PUBLICATIONS

PCT Notification of Transmittal of The International Search Report or the Declaration (PCT Rule 44.1) and PCT International Search Report (Oct. 29, 1996).

"A Building-Block Approach to LAN Switching" *Data Communications*, Jun. 1994, No. 9, New York, US.

"Newcomer Takes a New Tack on LAN Switching" *Data Communications*, Sep. 1994, No. 13, New York, US.

"A Smoother Segue to Switched Networking", Data Communications, Feb. 1994, No. 3, New York, US.

*Primary Examiner*—Douglas W. Olms
*Assistant Examiner*—Shick Hom
*Attorney, Agent, or Firm*—Blakely, Sokoloff, Taylor & Zafman LLP

[57] ABSTRACT

A communication interface with an expandable multilane cell bus that enables conversion of communication traffic received over a set of low speed or narrow band communication links according to a first communication protocol into a series of communication cells according to a second communication protocol. The cell bus enables concentration of the communication cells for transfer over a high speed communication link according to the second protocol. The communication interface includes a cell bus master that polls slave service modules while transferring communication cells to the service modules over a unidirection transmit portion of the cell bus and while receiving communication cells over a unidirection receive portion of the cell bus.

8 Claims, 11 Drawing Sheets

EXPANDABLE COMMUNICATION CELL BUS FOR MULTIPLEXING AND CONCENTRATING COMMUNICATION CELL TRAFFIC ONTO HIGH SPEED LINES

FIELD OF THE INVENTION

The present invention pertains to the field of digital communications. More particularly, this invention relates to a communication interface system with a cell bus that enables bandwidth concentration and protocol conversion among differing communication links.

BACKGROUND

Packet switching or cell switching communication networks such as asynchronous transfer mode communication networks are commonly employed to transfer digital information over long distances. An asynchronous transfer mode communication network enables the transfer of digital voice information, digital video information and digital data over short or long distances via common carrier communication links. Such a communication network enables a wide variety of communication devices to share common carrier communication links on a demand driven basis.

A typical wide area asynchronous transfer mode communication network can be viewed as comprising an access switching node and a service access multiplexer that multiplexes a variety of lower speed services to a single higher speed interface towards the access switch. The communication links employed in communication networks towards service access typically include communication links such as T1 communication links. A typical T1 communication link provides a maximum data rate of 1.544 megabits per second. The E1 common carrier communication links available in Europe provide a maximum data rate of 2.048 megabits per second.

In addition, the communication links employed in such asynchronous transfer mode communication networks between the service access multiplexer and the access switches usually include higher speed communication links such as T3 or OC3 communication links which provide a maximum data rate of 45 megabits per second (or 155 Mbps for OC3). An example of a high speed common carrier communication link available in Europe is the E3 communication link, which provides a maximum data rate of 34 megabits per second.

A typical wide-area asynchronous transfer mode communication network is comprised of a set of packet switching communication controllers coupled for communication over such common carrier communication links. The topology of such a network typically requires that one or more of the communication networks perform tandem switching among high speed communication links such as T3 or E3 links. A communication controller typically performs tandem switching by receiving a communication cell over one communication link and transmitting the communication cell over another communication link to route the cell to the proper destination in the network.

In such prior networks, the communication controllers that perform tandem switching may also be coupled to various types of customer premises equipment. Such customer premises equipment may includes, for example, relatively low speed circuit switching communication devices such as private branch exchanges (PBX) coupled to T1 or E1 communication links. In such a network, the communication controllers that perform high speed tandem switching are typically required to perform protocol conversion and bandwidth matching between the low speed T1 or E1 links and the high speed asynchronous transfer mode links.

Typically, the capacity of such an asynchronous transfer mode communication network is limited by the bandwidth and connectivity of the communication controllers that perform tandem switching among the high speed links. Unfortunately, such low speed circuit switching functions usually limit the ability of broadband communication controllers to perform high speed tandem switching. For example, such low speed communication links typically occupy physical connectivity space in such a broadband switching controller that might otherwise be allocated for high speed tandem switching on a high speed communication link.

Moreover, such broadband communication controllers designed for high speed tandem switching on T3 or E3 communication links provide more bandwidth than is necessary for such low speed circuit switching communication links. Such bandwidth overkill in a communication controller typically increases the cost of connectivity for such circuit switching lower speed customer premises equipment.

SUMMARY AND OBJECTS OF THE INVENTION

One object of the present invention is to provide a communication interface that enables the multiplexing and concentration of low speed communication traffic onto high speed asynchronous transfer mode communication links.

Another object of the present invention is to provide an interface controller that converts between various communication protocols and high speed asynchronous transfer mode communication protocols.

A further object of the present invention is to provide an interface controller that increases the physical connectivity available to broadband tandem switching controllers in an asynchronous transfer mode communication network.

Another object of the present invention is to provide a cell bus that enables concentration of low speed communication traffic onto a high speed asynchronous transfer mode communication link.

Another object of the present invention is to provide a cell bus that enables protocol conversion between differing types of communication links in a communication network.

Another object of the present invention is to provide an expandable multi-lane cell bus that provides a low speed interface to service interfaces, and a high speed interface towards the concentrating end.

Another object of the present invention is to provide an interface controller having an expandable cell bus that enables communication traffic concentration and protocol conversion.

These and other objects are provided by a communication interface with an expandable cell bus. The communication interface includes a network module and a set of service modules coupled to the cell bus that convert communication traffic received over a set of low speed communication links according to a first communication protocol into a series of communication cells according to a second communication protocol. The service module concentrates the communication cells onto the cell bus for transfer to the network module. The network module receives the communication cells over the cell bus and transfers the communication cells over a high speed communication link according to the second protocol. The network module is also the cell bus master that polls the service modules while transferring communication cells to the service modules over a unidirection transmit portion of the cell bus and while receiving communication cells over a unidirection receive portion of the cell bus.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

According to embodiments described herein, a service access interface shelf is coupled between customer premise equipment (not shown) and a broadband switching controller that provides access to a communication network. Each service access interface shelf performs bandwidth concentration and protocol conversion to allow for communication between the customer premise equipment and the communication network. Each service access interface shelf includes a network module, a shelf controller, and a set of service modules, all of which are coupled as components of a cell bus. The cell bus may be easily expanded without increasing the complexity of the cell bus components. Such expansion is provided by a shelf interface circuit that is coupled to the cell bus as a cell bus component. A second service access interface shelf having a second cell bus may be added to the service access interface by coupling the second shelf to the shelf interface circuit. The linked cell buses of multiple service access interface shelves logically operate as a single cell bus.

Additional advantages are achieved by providing each cell bus with multiple bus lanes for transferring data between the communications network and the customer premise equipment. According to one embodiment, each cell bus includes four bus lanes. Two or more bus lanes may be logically coupled together to act as a single bus lane, or all four bus lanes may operate individually.

Figure 1:
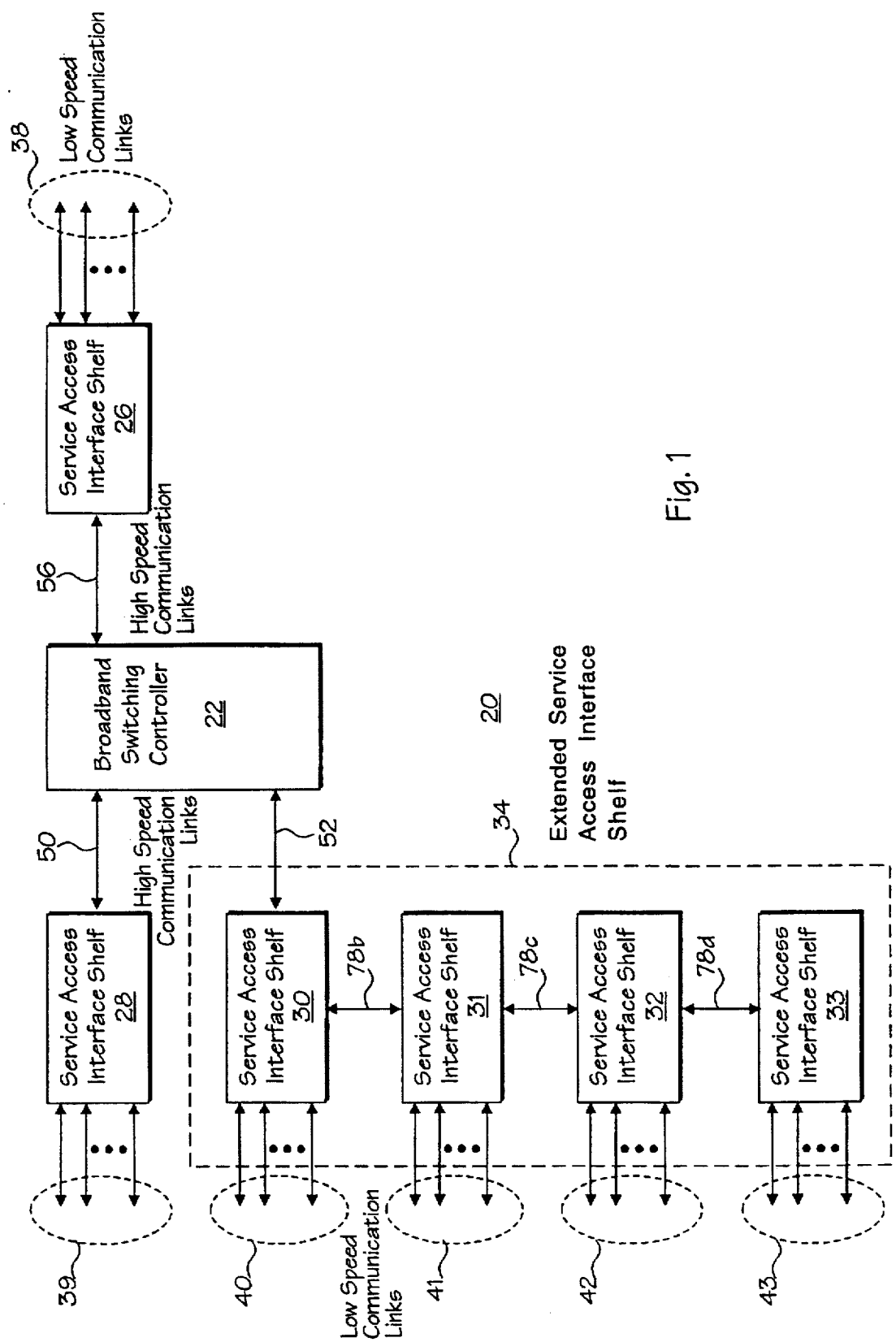
FIG. 1 illustrates a communication network which comprises a broadband switching controller and a set of interface shelves that concentrate communication traffic for the broadband switching controller.

FIG. 1 illustrates a communication network 20. The communication network 20 comprises a broadband switching controller 22 that performs high speed tandem cell switching functions via a set of high speed communication links 50-56. The broadband switching controller 22 performs high speed tandem switching according to an asynchronous transfer mode communication protocol. For one embodiment, the broadband communication links 50, 52, and 56 each comprise a T3 communication link.

The communication network 20 further comprises a service access interface shelf 26, a service access interface shelf 28, and an extended service access interface shelf 34. Each of the service access interface shelves 26 and 28 enables communication between a set of low speed communication links and the broadband switching controller 22. For example, the service access interface shelf 26 enables communication between circuit switching communication devices coupled to a set of T1 communication links 38 and the broadband switching controller 22 via the broadband communication link 56.

The service access interface shelf 26 concentrates communication traffic transferred via the low speed communication links 38 onto the high speed communication link 56. The service access interface shelf 26 also converts between the asynchronous transfer mode communication protocol on the high speed communication link 56 and the communication protocols on the low speed communication links 38.

Similarly, the service access interface shelf 28 enables communication between a set of T1 communication links 39 and the broadband switching controller 22 via the broadband communication link 50. The service access interface shelf 28 enables concentration and conversion from the communication protocol of the low speed or narrow band communication links 39 to the asynchronous transfer mode protocol of the high speed communication link 50. For another embodiment, there are additional service access interface shelves similar to service access interface shelves 26 and 28.

The extended service access interface shelf 34 comprises a set of service access interface shelves 30-33. The service access interface shelves 30-33 each perform communication protocol conversion and bandwidth concentration for communication between corresponding sets of low speed or narrow band communication links 40-43 and the broadband switching controller 22 via the broadband communication link 52.

Each service access interface shelf 26, 28, and 30-33 includes a cell bus that enables bandwidth concentration between the corresponding set of low speed or narrow band communication links and the corresponding high speed communication link coupled to the broadband switching controller 22. The cell bus internal to the service access interface shelf 30 extends to the service access interface shelf 31 via a cell bus extension 78b. Similarly, the cell bus internal to the service access interface shelf 31 is expanded to the service access interface shelf 32 via a cell bus extension 78c, and the cell bus internal to the service access interface shelf 32 is expanded to the service access interface shelf 33 via a cell bus extension 78d.

Figure 2:
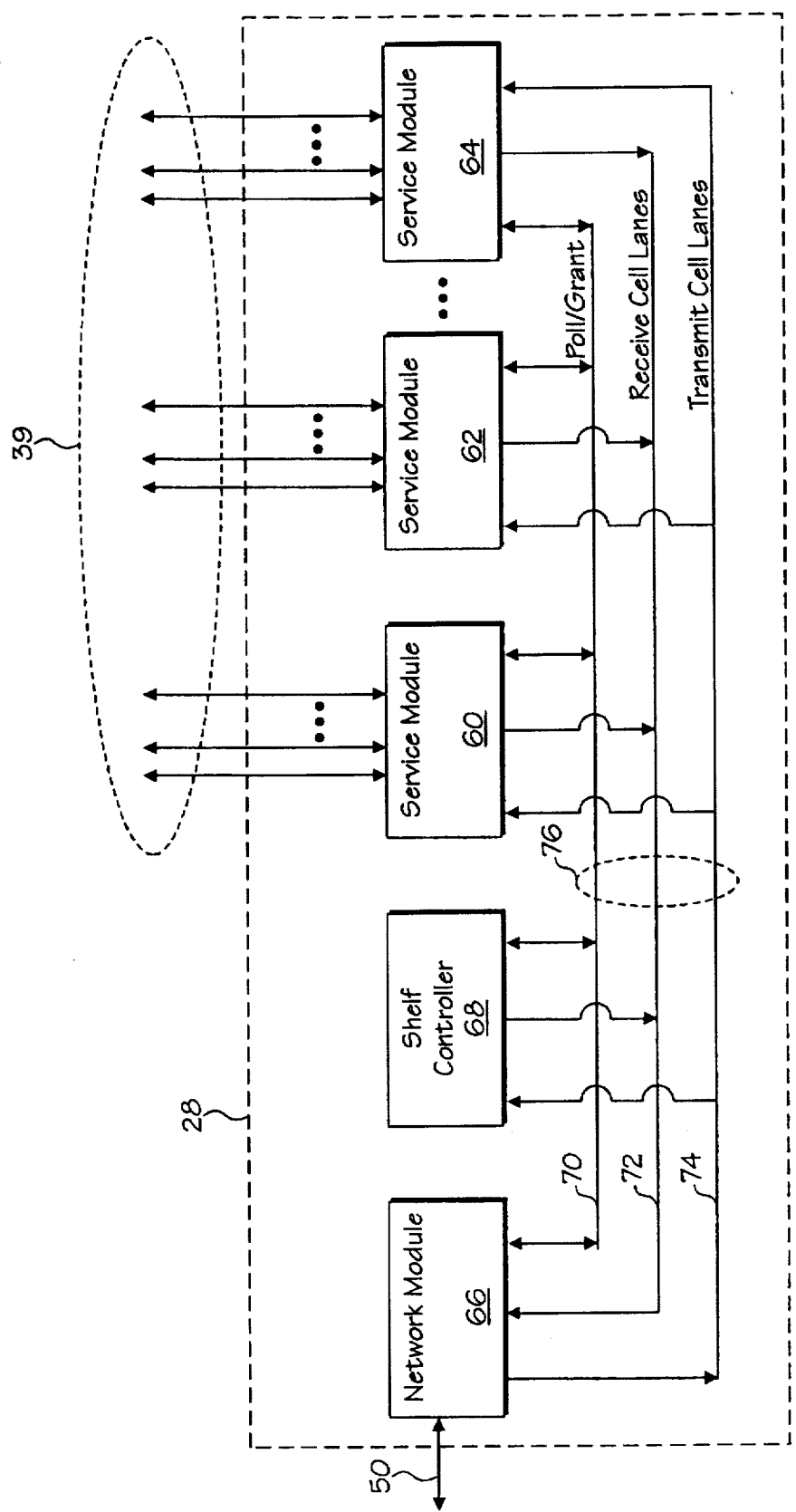
FIG. 2 illustrates an interface shelf which includes a network module, a shelf controller, and a set of service modules each coupled to cell bus.

FIG. 2 illustrates the service accessing service access interface shelf 28 for one embodiment. The service accessing interface shelf 28 comprises a network module 66, a shelf controller 68, and a set of service modules 60-64. The network module 66 is coupled as a cell bus master of a cell bus 76. The shelf controller 68 and the service modules 60-64 are each coupled as slaves on the cell bus 76.

The network module 66 enables communication with the broadband switching controller 22 via the high speed communication link 50 according to an asynchronous transfer mode communication protocol. For one embodiment, high speed communication link 50 is a T3 line. The network module 66 receives communication cells over the high speed communication link 50 and distributes the communication cells to the service modules 60-64 via the cell bus 76.

In addition, service modules 60 through 64 each receive communication cells from respective low speed communication links 39. Low speed communication links 39 are also referred to as narrow band communication links 39. For one embodiment, low speed communication links 39 are T1 lines. The service modules 60 through 64 then send the communication cells to network module 66 via cell bus 76. The network module 66 then transfers the communication cells received from the service modules 60-64 to the broadband switching controller 22 via the high speed communication link 50.

The cell bus includes multiple transmit and receive lanes. Each set of transmit and receive lanes are coupled to a subset of service module or shelf controllers (cell bus slaves) and are shared by such cell bus slaves. The aggregate bandwidth of the slaves on a cell bus lane is determined by the capacity of that cell bus lane.

The multiple cell bus lanes originating from the master and connected to different slave groups enables simultaneous transfer of multiple cells by the cell bus master. Any single slave transmits no more than one cell at a given time. This architecture minimizes the complexity of the slave module while increasing the overall throughput or capacity of the system. In one embodiment, four such lanes are implemented. Another advantage of such an architecture is that the network module can tie all the lanes together (as done in one embodiment) so that in essence there is only one lane—i.e., there is a simultaneous transfer of the same cell on multiple lanes. The number of such lanes depends on the design of the network module.

The service modules 60-64 enable communication over the low speed or narrow band communication links 39. Each service module 60-64 converts from the communication protocol of the low speed or narrow band communication links 39 into the asynchronous transfer mode communication protocol of the high speed communication link 50. In addition, each service module 60-64 performs communication cell assembly and disassembly functions during protocol conversion to the asynchronous transfer mode communication protocol. For one embodiment, the service modules 60-64 comprise up to 2 shelf controllers and 10 service modules, wherein each service module enables communication via a set of 4 T1 or E1 communication links carrying frame relay data streams.

The cell bus 76 comprises a poll/grant bus 70, receive cell lanes 72, and transmit cell lanes 74. The receive cell lanes 72 and the transmit cell lanes 74 each enable unidirectional synchronous communication between the network module 66 and the service modules 60-64. The network module 66 transfers communication cells to the service modules 60-64 via the transmit cell lanes 74 while polling the service modules 60-64 via the poll/grant bus 70. After arbitrating among the requests from the service modules 60-64, the network module 66 issues grant signals to the service modules 60-64 via the poll/grant bus 70. Thereafter, the appropriate service module 60-64 transfers a communication cell to the network module 66 via the receive cell lanes 72 while the network module transmits communication cells via the transmit cell lanes 74.

Each of the service modules 60-64 can also act as a router to another service module. For example, service module 60 can receive a series of communication cells from low speed (e.g., T1) link 39 and route those cells to another service module via cell bus 76. For example, service module 60 can receive communication cells from low speed communication line 39 and route those communication cells to service module 64 via cell bus 76.

Figure 3:
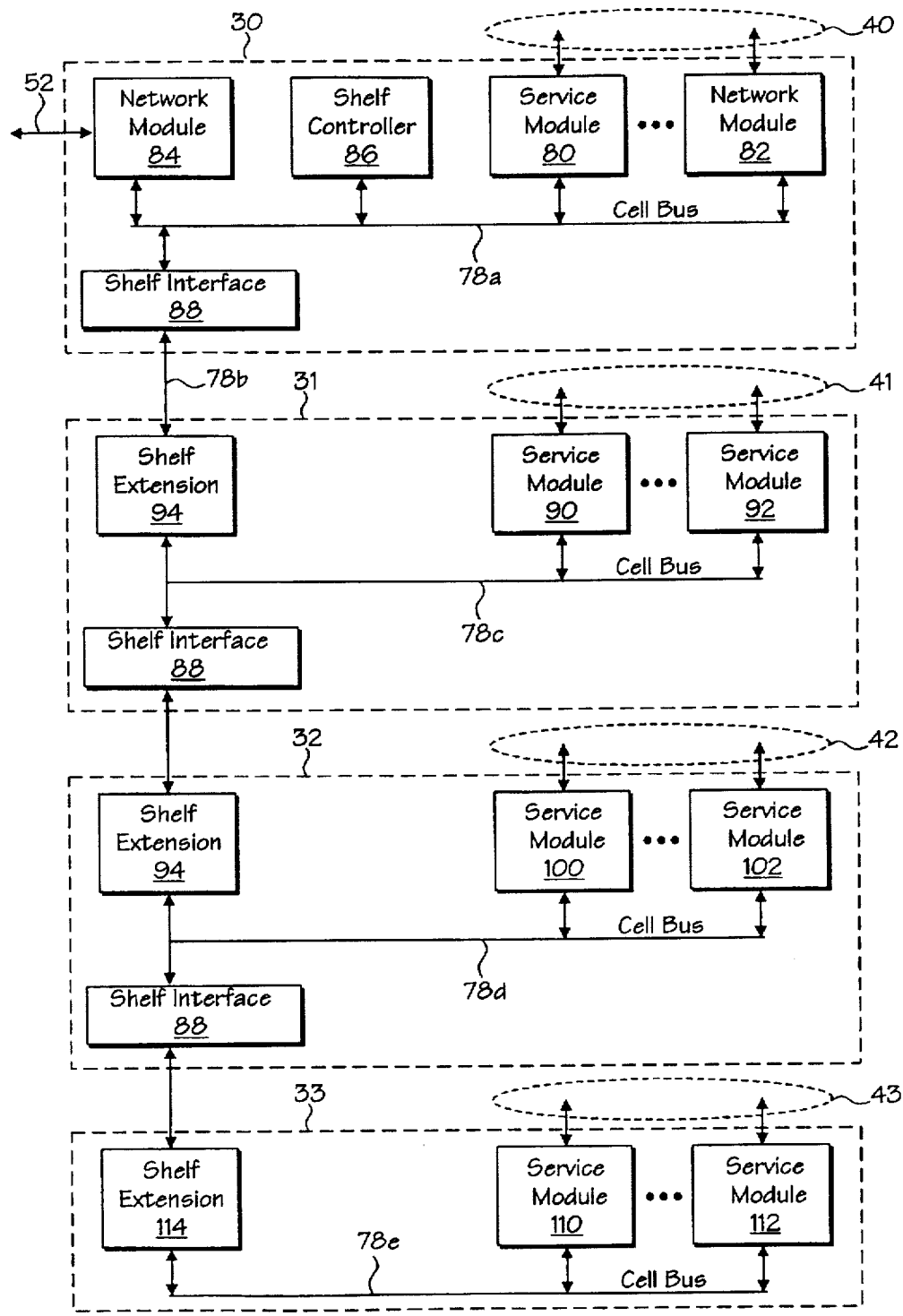
FIG. 3 illustrates an extended interface shelf for one embodiment which comprises a set of four interface shelves 30-33 coupled to corresponding internal cell busses that function together as an extended cell bus.

FIG. 3 illustrates the extended interface shelf 34 for one embodiment. The extended interface shelf 34 comprises the service access interface shelves 30-33. Each service access interface shelf 30-33 includes an internal cell bus substantially similar to the cell bus 76. The service access interface shelf 30 includes a cell bus 78a, the service access interface shelf 31 includes the cell bus 78c, the service access interface shelf 32 includes the cell bus 78d, and the service access interface shelf 33 includes a cell bus 78d. The cell bus 78a and the cell bus extension 78b and the cell busses 78c-78e taken together function logically as a single extended cell bus 78 and includes a poll/grant bus, a receive bus, and a transmit bus.

The service access interface shelf 30 comprises a network module 84, a shelf controller 86, a set of service modules 80-82, and a shelf interface 88. The cell bus 78a enables communication between the network module 84 and the service modules 80-82. The network module 84 is the cell bus master for the logical cell bus 78 and the service modules 80-82 are each a cell bus slave on the logical cell bus 78.

The network module 84 receives communication cells via the high speed communication link 52 according to an asynchronous transfer mode communication protocol. The network module 84 then distributes the incoming communication cells to the appropriate service module 80-82 via the cell bus 78a. The service modules 80-82 each convert communication cells received from the network module 84 from the asynchronous transfer mode communication protocol to the communication protocol required by the low speed or narrow band communication links 40.

The service modules 80-82 each receive communication messages via the low speed or narrow band communication links 40. The service modules 80-82 convert from the protocol of the low speed or narrow band communication links 40 to the asynchronous transfer mode communication protocol of the high speed communication link 52. The service modules 80-82 thereafter transfer the communication cells to the network module 84 via the cell bus 78a. The network module 84 then transfers the communication cells to the broadband switching controller 22 via the high speed communication link 52.

The service access interface shelf 31 comprises a shelf extension 94 and a set of service modules 90-92. The service modules 90-92 enable communication via the low speed or narrow band communication links 41. The shelf interface 88 enables extension of the cell bus 78a to the service access interface shelf 31 via the cell bus extension 78b. The shelf interface 88 and the shelf extension 94 effectively extend the logical cell bus 78 to the service modules 90-92 via the cell bus extension 78b and a cell bus 78c. The shelf interface 88 and the shelf extension 94 electrically isolate the cell bus 78c from the cell bus 78a and provide a one clock cycle delay. The shelf interface 88 and the shelf extension 94 enable the network module 84 to transfer communication cells to the service modules 90-92 as cell bus master, and enables the service modules 90-92 as cell bus slaves to transfer communication cells to the network module 84.

The service access interface shelf 32 comprises a shelf extension 104 and a set of service modules 100-102. The service modules 100-102 enable communication via the low speed or narrow band communication links 42. The shelf extension 104 effectively extends the cell bus 78c to the cell bus 78d. The shelf extension 104 electrically isolates the cell bus 78c from the cell bus 78d and provide a one clock cycle delay while enabling communication between the network module 84 and the service modules 100-102.

The service access interface shelf 33 comprises a shelf extension 114 and a set of service modules 110-112. The service modules 110-112 enable communication via the low speed or narrow band communication links 43. The shelf extension 114 electrically isolates the cell bus 78d from the cell bus 78e and provide a one clock cycle delay while enabling communication between the network module 84 and the service modules 110-112.

The shelf interface 88 and the shelf extensions 94, 104, and 114 provide the extended logical cell bus 78 for communication between the network module 84 and the service modules 90-92, 100-102, and 110-112. For one embodiment, each set of service modules 90-92, 100-102, and 110-112 comprise a set of 12 service modules wherein each service module enables communication via a set of 4 T1 communication links. The logical cell bus 78 provided by the cell busses 78a-78e enables bandwidth concentration between the low speed or narrow band communication links 40-43 and the high speed communication link 52.

Figure 4:
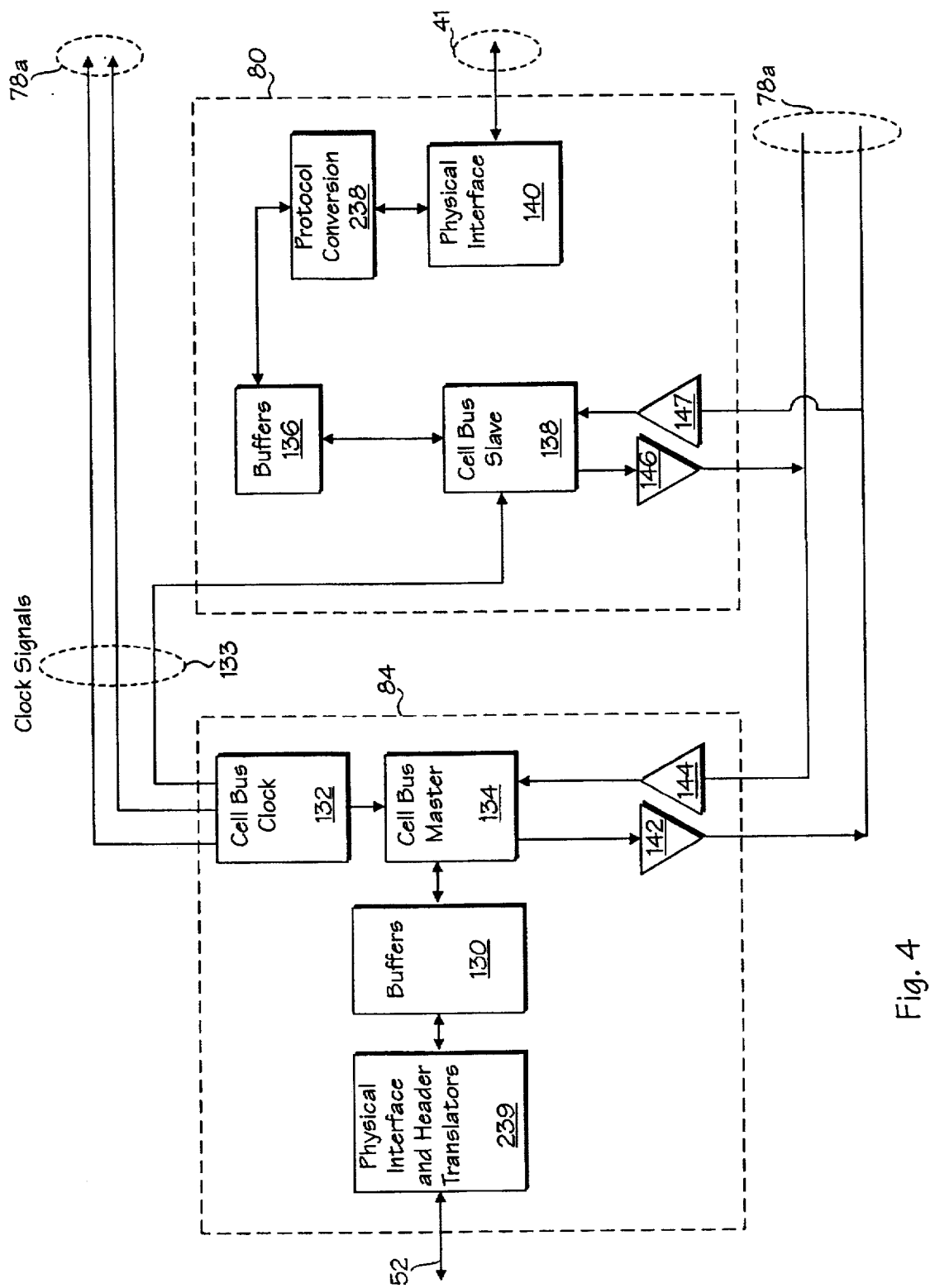
FIG. 4 illustrates the architecture of a network module cell bus master and a cell bus slave for one embodiment.

FIG. 4 illustrates the architecture of a cell bus master and a cell bus slave for one embodiment. Examples of a cell bus master includes the network module 84 or 66 and examples of a cell bus slave includes the service modules 60-64, 80-82, 90-92, 100-102, or 110-112. The network module 84 is the master of the cell bus 78 including the cell bus 78a and the cell busses 78c-78e. The service module 80 is a slave on the cell bus 78a and therefore the logical cell bus 78.

The network module 84 comprises the cell bus master circuit 134, a set of storage buffers 130, and a cell bus clock circuit 132. In one embodiment, these storage buffers are first in first out (FIFO) buffers. Incoming communication cells to the network module 84 are buffered in the FIFO buffers 130 from the physical interface and header translators 239. The cell bus master circuit 134 accesses the incoming communication cells from the FIFO buffers 130 and distributes the communication cells via the unidirectional transmit bus portion of the logical cell bus 78 through a driver 142. The number of cells simultaneously distributed is a function of the number of cell bus lanes the network module supports. In one embodiment, the network module transmits one cell only. The cell bus master circuit 134 receives communication cells through a receiver 144 via the receive bus of the cell bus 78. The cell bus clock circuit 132 generates a set of clock signals 133. The clock signals 133 are distributed to the service modules 80-82. The clock signals 133 synchronize the transfer of information over the cell bus 78a portion of the logical cell bus 78.

The service module 80 comprises a cell bus slave circuit 138, a set of storage buffers 136, a protocol conversion block 238, a physical interface module 140, a driver 142, and a receiver 147. In one embodiment, these storage buffers are first in first out (FIFO) buffers. The cell bus slave circuit 138 responds to polls over the cell bus 78a from the cell bus master circuit 134. The cell bus slave circuit 138 receives communication cells via receiver 147 and cell bus 78a from the cell bus master circuit 134. The cell bus slave circuit 138 buffers the communication cells in buffers 136. The communication cells then go through a protocol conversion as needed and prepared for transmission (via physical interface module 140) over the low speed or narrow band communication link 41.

In addition, the physical interface module 140 receives communication data via the low speed or narrow band communication link 41 and stores the communication data into the FIFO buffers 136 after protocol conversion. Thereafter, the cell bus slave circuit 138 accesses the communication data from the FIFO buffers 136. In response to a grant from the cell bus master circuit 134, the cell bus slave circuit 138 transfers communication cells to the cell bus master circuit 134 via driver 146 and via the bus receivers 144 of the logical cell bus 78.

Figure 5:
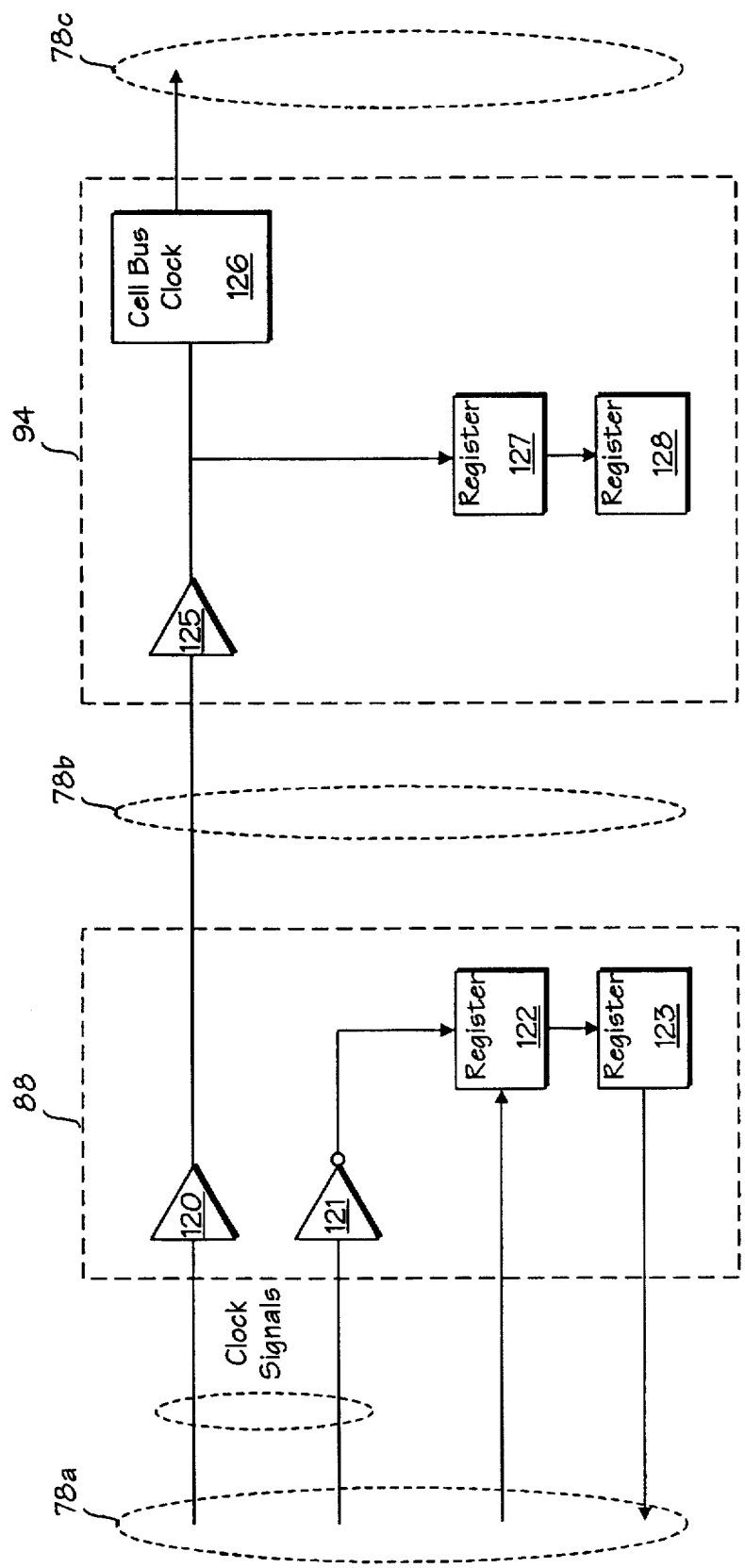
FIG. 5 illustrates the circuitry of a shelf interface and a shelf extension for one embodiment that together extend a cell bus to other interface shelves.

FIG. 5 illustrates the circuitry of the shelf interface 88 and the shelf extension 94 for one embodiment. The shelf interface 88 and the shelf extension 94 extend cell bus 78a to the cell bus extension 78c for communication with the service modules 90-92.

The shelf interface 88 comprises a pair of drivers 120 and 121 that drive the clock signals 133 from the cell bus clock circuit 132. A set of registers 122 and 123 electrically isolate and delay data transferred via the transmit and receive busses of cell bus 78a.

The shelf extension 94 includes a receiver 125 and a cell bus clock circuit 126 that generates clock signals for the cell bus 78c to the service modules 90-92. A set of registers 127-128 buffer and delay the unidirectional data transferred via the transmit and receive busses of the cell bus extension 78c.

Figure 6:
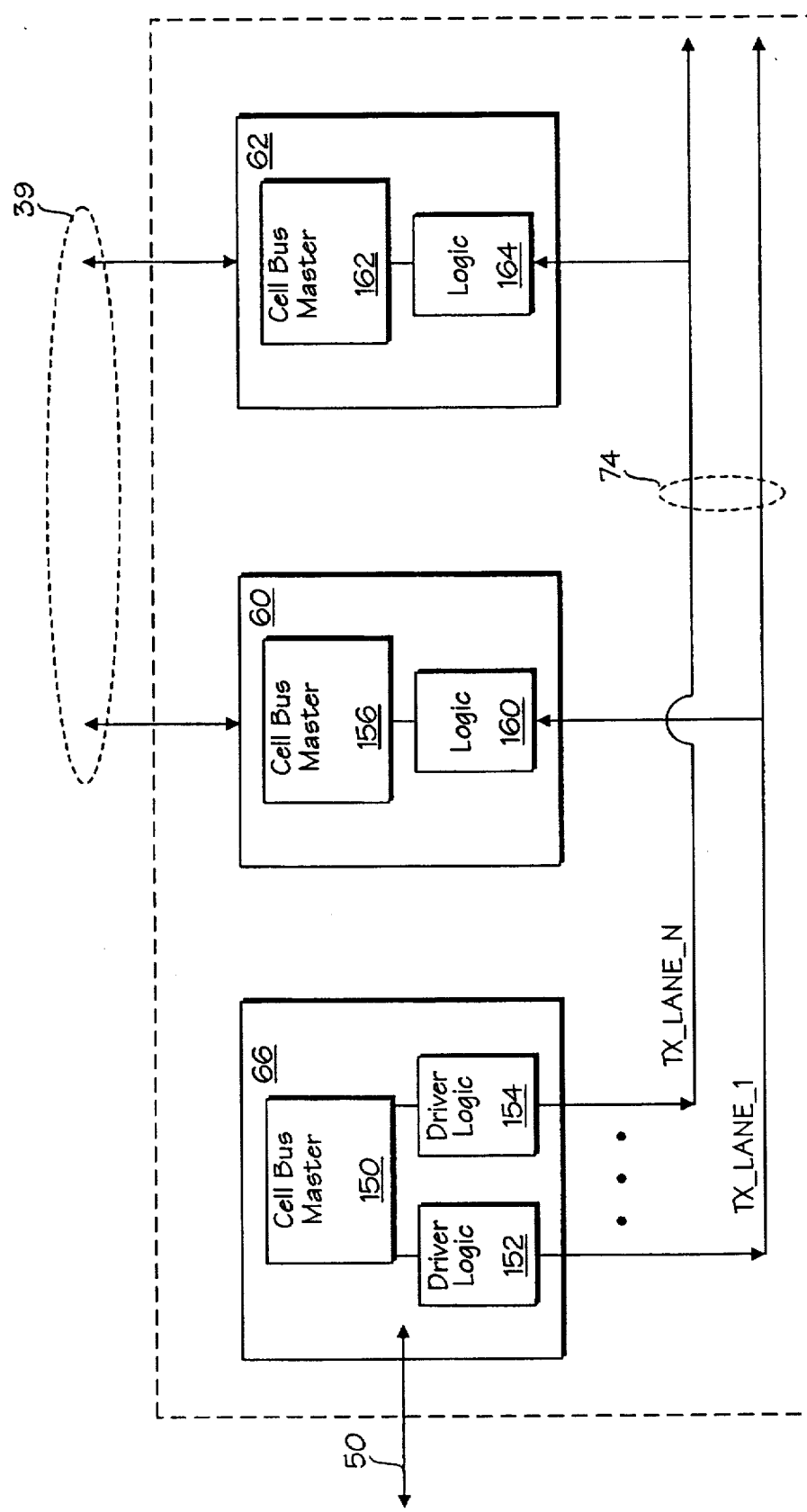
FIG. 6 illustrates the unidirectional transfer of communication cells between a cell bus master and a set of cell bus slaves via the multi-lane transmit bus portion of a cell bus which includes transmit bus lanes 1 through n wherein each transmit bus lane connects to a small number of different cell bus slaves.

FIG. 6 illustrates the unidirectional transfer of data between a cell bus master and a set of cell bus slaves via the transmit bus portion of a cell bus. The diagram shows data transfer between the network module 66 and the service modules 60-62 via the transmit cell lanes 74 of the cell bus 76. The transmit cell lanes 74 comprises multiple transmit lanes (TX__LANE1, . . . TX-LANE__N). A cell bus master 150 in the network module 66 concurrently transfers separate communication cells via the transmit cell lanes 74 through a set of driver logic 152 and 154.

The service modules 60-62 each contain circuitry that monitors one of the transmit lanes of the transmit cell lanes 74. For example, the service module 60 includes a set of logic 160 that monitors transmit lanes TX__LANE1 of the transmit cell lanes 74 and the service module 62 monitors TX__LANE__N. The first overhead byte of each communication cell transferred over the transmit cell lanes 74 indicates the destination slave service module for the communication cell on each transmit lane. Even though multiple communication cells are concurrently transferred over the transmit cell lanes 74, any service module monitors only one of the transmit cell lanes. The cell bus master transmits the cells to the appropriate service module on their appropriate transmit cell lanes.

For one embodiment, each communication cell transferred over the transmit cell lanes 74 comprises 56 bytes. The 56 bytes include 52 bytes of a communication cell according to the asynchronous transfer mode communication protocol of the communication link 50 (with the header error check ("HEC") byte stripped off) and a four byte overhead. The first byte of the four byte overhead of each communication cell transferred via the transmit cell lanes 74 indicates the destination slave service module for the corresponding communication cell.

Figure 7:
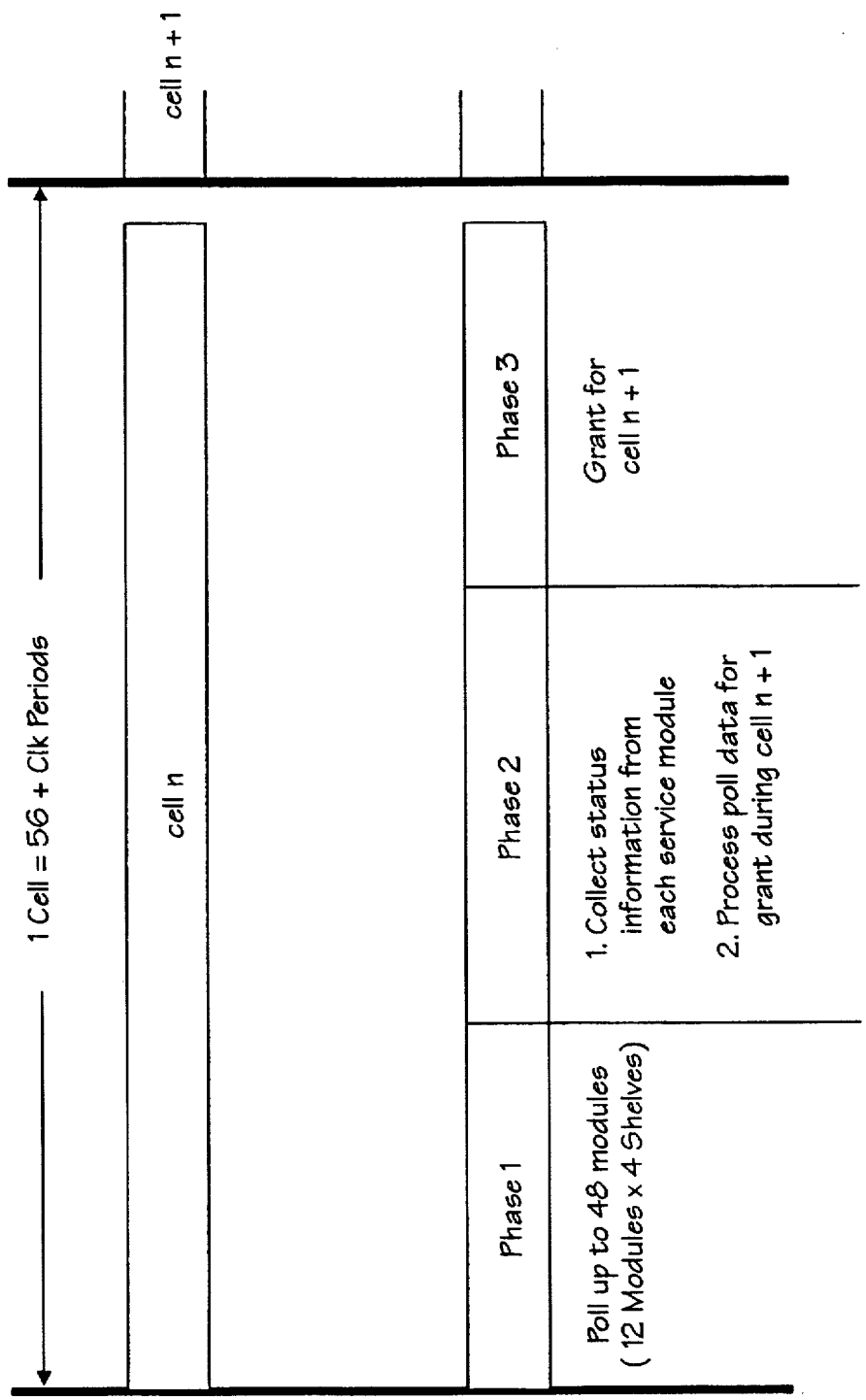
FIG. 7 illustrates the timing of communication cell transfer via the cell bus wherein a communication cell interval comprises 56 clock periods subdivided into three phases, phase 1 through phase 3, plus two additional clock periods.

FIG. 7 illustrates the timing of communication cell transfer via the cell bus 76 or the cell bus 78a for one embodiment. The transfer of a communication cell comprises 56 clock periods subdivided into three phases, phase 1 through phase 3, plus two additional clock periods. During phase 1 through phase 3, the cell bus master transfers one communication cell (cell n) via each of the transmit lanes of the transmit bus.

Also during phase 1, the cell bus master polls the slaves coupled to the cell bus. For example, the network module 84 polls service modules 80-82, 90-92, 100-102, and 110-112 via the poll/grant bus of the cell buses 78a-78e.

During phase 2, the cell bus master receives status information from the slaves coupled to the cell bus. For example, the network module 84 receives status information from the service modules 80-82, 90-92, 100-102, and 110-112 via the poll/grant buses of the cell buses 78a-78e. For one embodiment, two bits of status information is collected from the cell bus slaves during each cell period. During phase 2, the poll data is processed for grant during cell n+1.

Thereafter during phase 3, the cell bus transfers a grant for the next communication cell cycle to the slaves coupled to the cell bus. For example, the network module 84 transfers a grant for the next communication cell cycle via the poll/grant buses of the cell buses 78a-78e.

Figure 8:
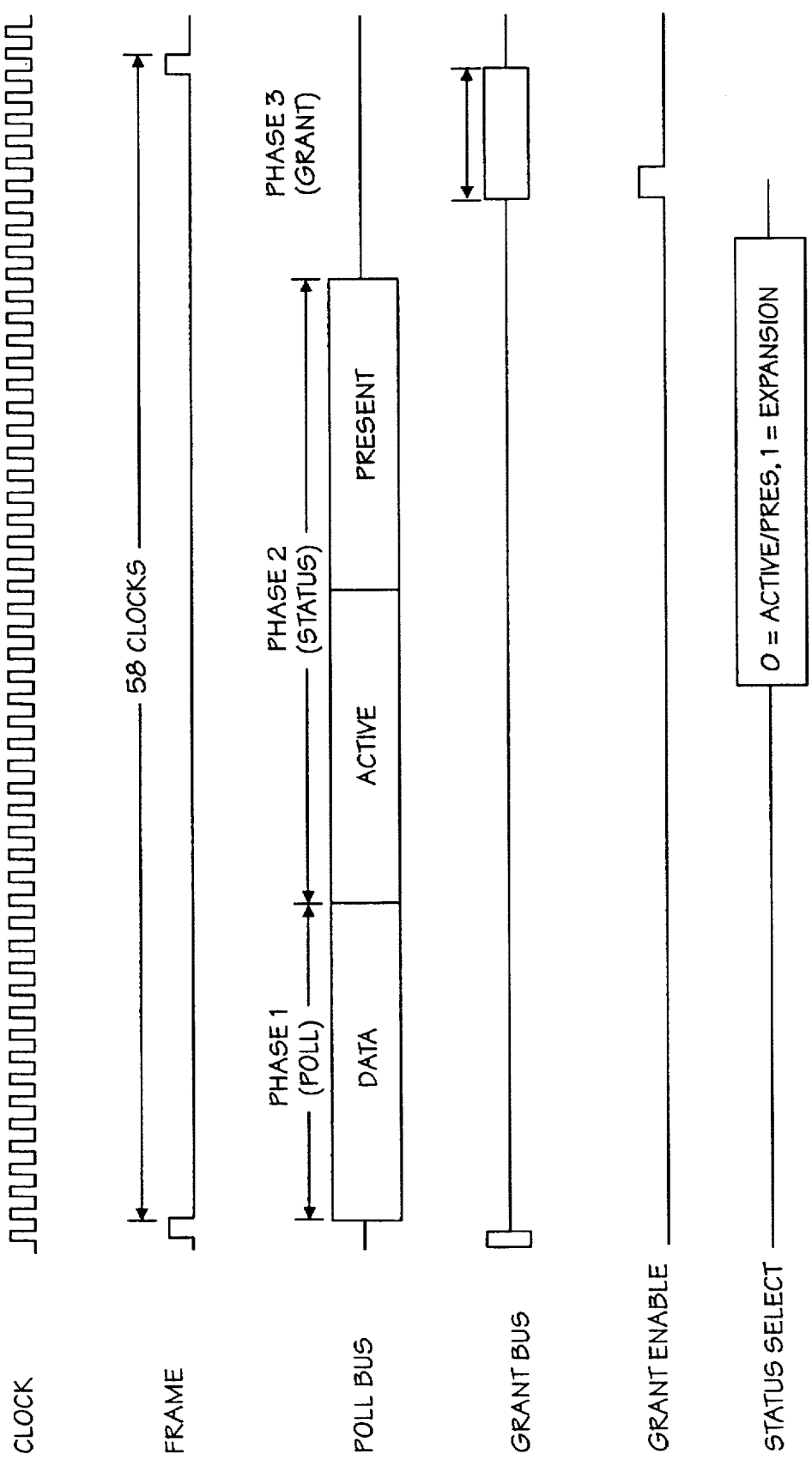
FIG. 8 illustrates the timing of the poll/grant portion of a cell bus for one embodiment.

FIG. 8 illustrates the timing of the poll/grant buses of the cell bus 76 or the cell bus 78a for one embodiment. The signals include a frame signal, a poll bus signal, a grant bus signal, a grant enable signal, and a status select signal. The poll bus comprises six poll signal lines, each shared by a pair of adjacent service modules. The grant bus signal comprises six signal lines, four representing the physical slot number, and two representing the shelf number. The frame, poll bus, grant bus, grant enable, and status select signals are synchronized by the clock signal from the network module 66. Communication cell transfer intervals on the cell bus are synchronized by the frame signal. The poll bus signal is used by the slave service modules to return status information to the cell bus master for subsequent arbitration and grant decisions. The grant bus and the grant enable signals are used by the cell bus master to indicate arbitration resolution.

Figure 9:
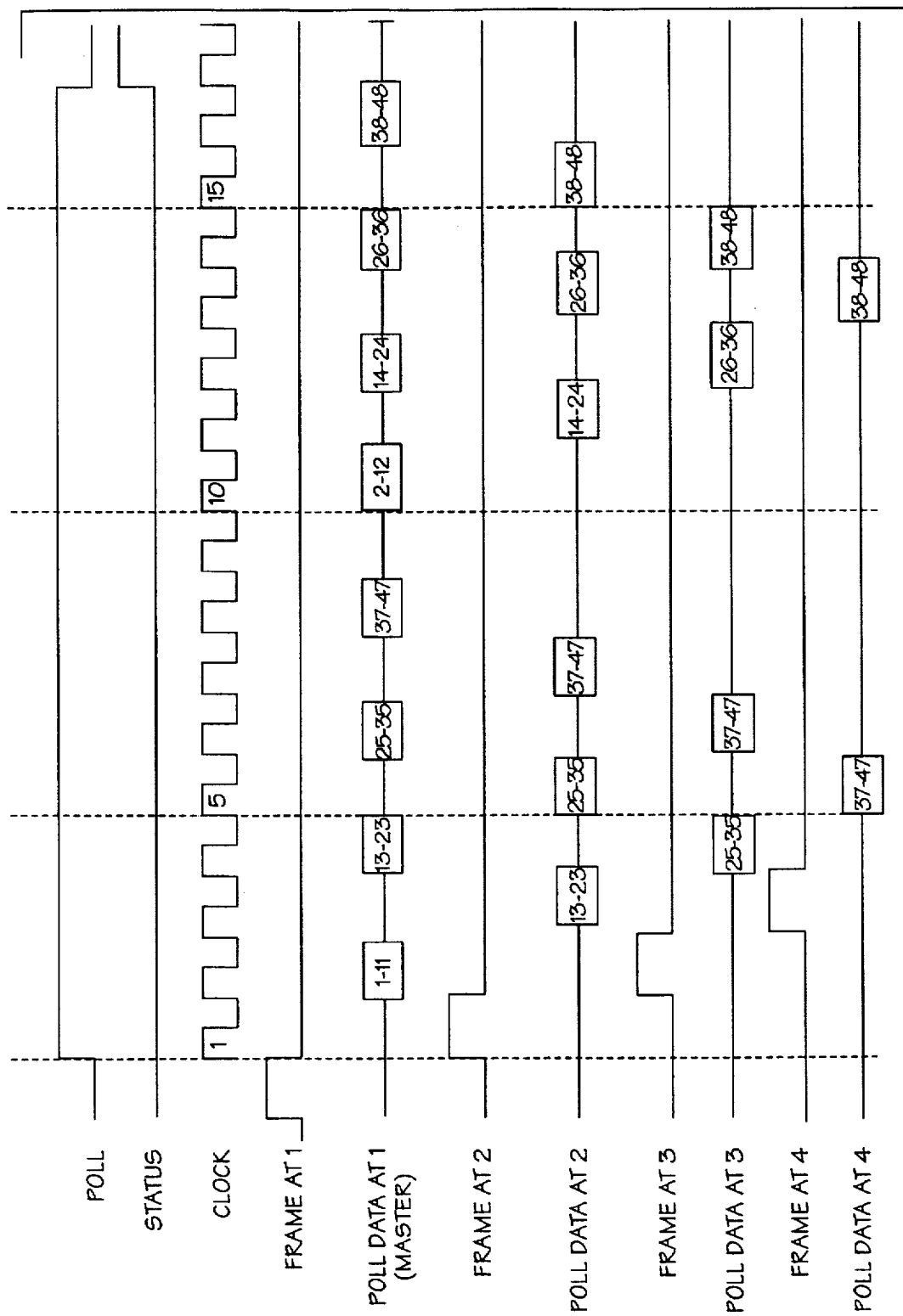
FIG. 9 illustrates the timing of a poll on the poll/grant bus of a cell bus for one embodiment.

FIG. 9 illustrates the timing of a poll on the poll/grant bus of the cell bus 78a with respect to the embodiment shown in FIG. 3. The interface shelves 30-33 are referred to as shelf1-shelf4. Each shelf1-shelf4 accommodates up to 12 service modules, referred to as links 1-12, 13-24, 25-36, and 37-48, respectively.

The "Poll Data At 1"-"Poll Data At 4" represents the poll data for up to 48 service module or slaves from shelves shelf1-shelf4, respectively. The "Poll Data At Master" (also referred to as "Poll Data At 1") represents the poll data via the cell bus 78a of shelf1. The "Poll Data At 2" represents the poll data via the cell bus 78c of shelf2, which is then propagated to shelf1. The "Poll Data At 3" represents the poll data via the cell bus 78d of shelf3, which is then propagated to shelf1 via shelf2. "Poll Data At 4" represents the poll data via the cell bus 78e of shelf4, which is then propagated to shelf1 via shelf3 and shelf2.

Figure 10:
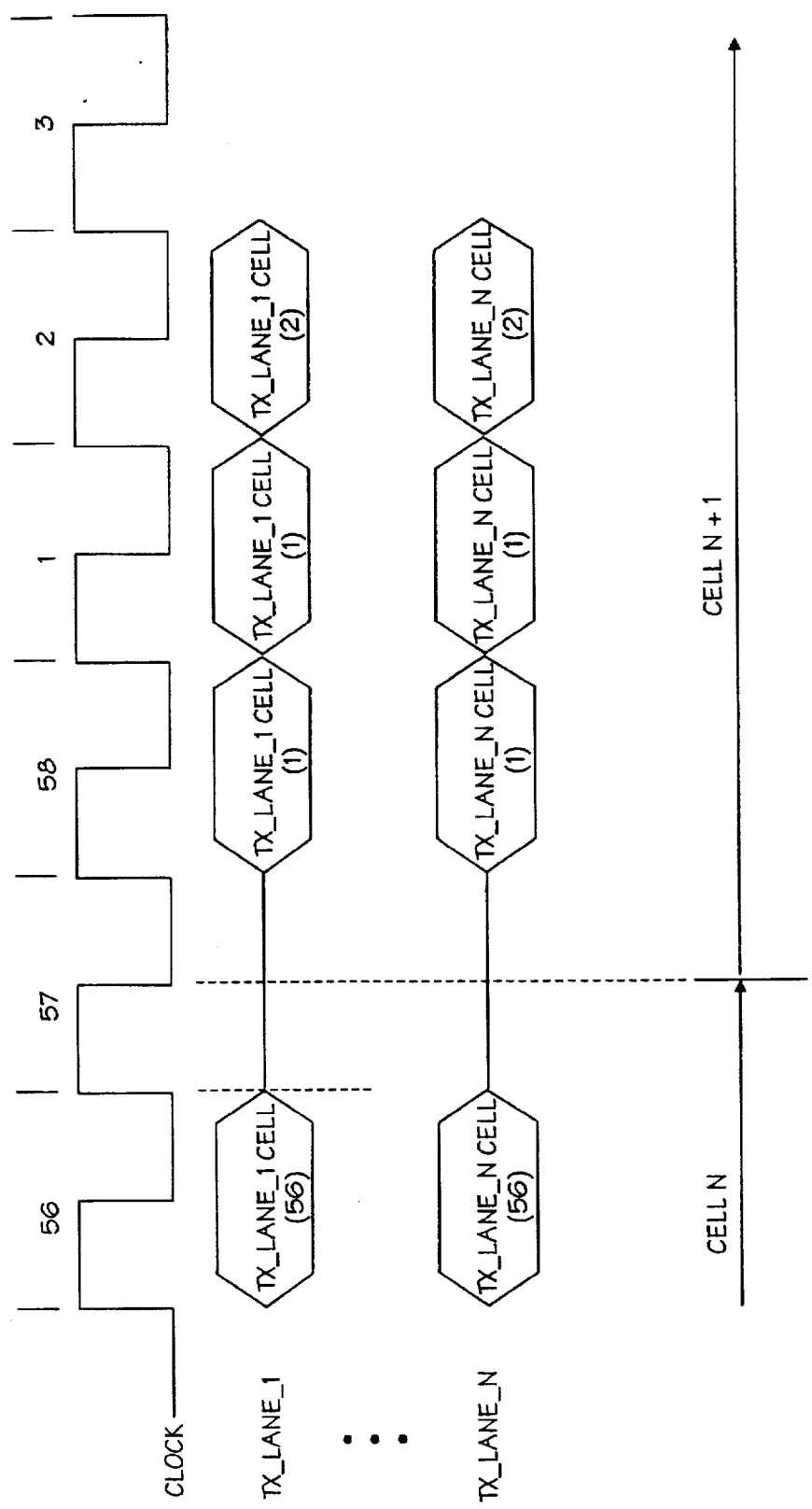
FIG. 10 illustrates the transition between communication cell transfer intervals on the multi-lane transmit busses of a cell bus during the two additional clock periods of a communication cell interval.

FIG. 10 illustrates the transition between communication cell transfer intervals on the transmit busses of the cell bus 76 or 78 for one embodiment. During clock period 56, the cell bus master transfers byte 56 of a communication cell on each transmit cell lane of the transmit bus.

During clock periods 57 and 58, the active service modules on the cell bus for the communication cell n disconnect from the cell bus while the service modules for the communication cell n+1 connect to the cell bus. During clock period 58 and clock period 1, the cell bus master transfers byte 1 of a communication cell on each of the transmit cell lanes of the transmit bus.

During clock period 58, each slave service module on the cell bus samples byte 1 of the transmit cell lane they receive. Thereafter, during clock period 1 of cell interval n+1, each slave service module on the cell bus samples byte 1 again. Each slave service module on the cell bus uses this sampled low to determine whether to receive bytes 2-56 of the corresponding communication cells.

Figure 11:
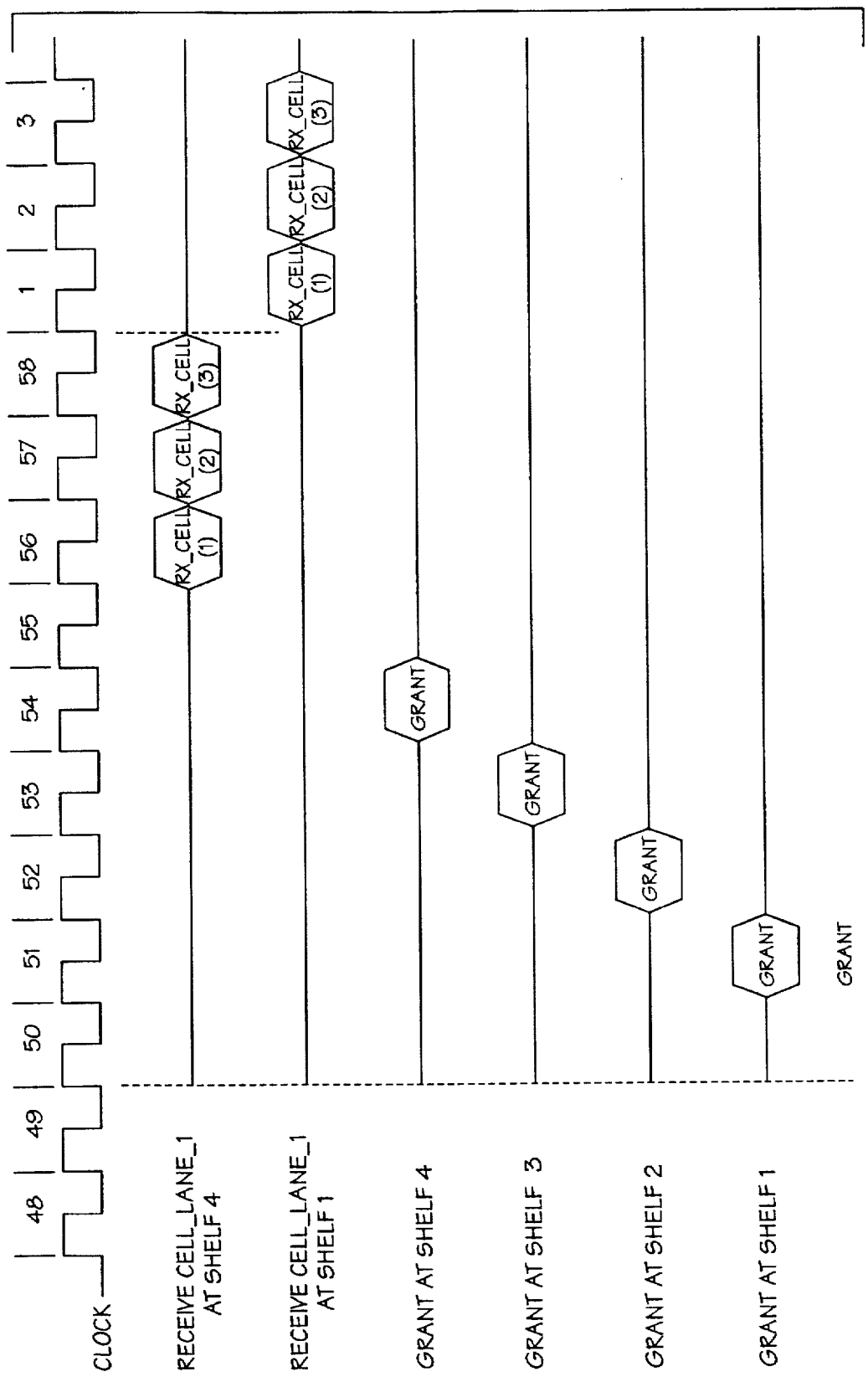
FIG. 11 illustrates a grant sequence to the slave service modules coupled to a multi-shelf cell bus for one embodiment.

FIG. 11 illustrates a grant sequence to the slave service modules coupled to a multi-shelf cell bus for one embodiment. Due to the pipelined nature of the signals, any control information to the shelves has to be issued earlier so that the response ripples through the pipeline and back to the cell bus master in shelf1. For example, a grant to a service module in shelf4 is issued by the cell bus master in shelf1 at clock period 51. This is sensed by the service module at clock period 54. In response to this, it transmits a cell at clock period 56. This propagates through the multi-shelf pipeline and reaches shelf1's cell bus master at clock period1, coinciding with the clock time when the slave in shelf1 would be transmitting. These signals propagate from shelf1 on cell bus 78a to shelf2 on cell bus 78c to shelf3 on cell bus 78d to shelf4 on cell bus 78e and back.

In the foregoing specification the invention has been described with reference to specific exemplary embodiments thereof. It will, however, be evident that various modifications and changes may be made thereto without departing from the broader spirit and scope of the invention. The specification and drawings are accordingly to be regarded as illustrative rather than a restrictive sense.

What is claimed is:

1. A communication interface, comprising:
 a set of service modules each configured to accept communication traffic received over a set of low speed or narrow band communication links according to a first communication protocol and to convert the communication traffic to a series of first communication cells according to a second communication protocol;
 a network module configured to receive the first communication cells and to transfer the first communication cells over a high speed communication link according to the second communication protocol; and
 a cell bus coupling the network module to each of the service modules and configured as a unidirectional synchronous transmit bus, a unidirectional synchronous receive bus and a synchronous poll/grant bus, the cell bus adapted to transport the first communication cells according to the second communication protocol.

2. The communication interface of claim 1, wherein the network module is further configured to receive a series of second communication cells over the high speed communication link and to distribute the second communication cells to the service modules over the cell bus, and wherein the service modules are further configured to receive the second communication cells over the cell bus and to convert the second communication cells to communication traffic according to the first communication protocol for transfer over the low speed or narrow band communication links.

3. The communication interface of claim 2, wherein a first service module of the set of service modules is configured to route a series of third communication cells representing communication traffic received over one of said low speed or narrow band communication links to a second service module of the set of service modules over the cell bus when the destination of the third communication cells is the second service module.

4. The communication interface of claim 3, wherein the network module polls the service modules over the poll/grant bus while transferring the second communication cells to the service modules over the transmit bus and while receiving the first communication cells from the service modules over the receive bus.

5. The communication interface of claim 4, further comprising circuitry coupled to the cell bus and configured to extend the cell bus to another communication interface by delaying and desynchronizing the polls on the poll/grant bus, the second communication cells on the transmit bus, and the third communication cells on the receive bus.

6. The communication interface of claim 3, wherein the unidirectional synchronous transmit bus has multiple lanes for transporting the second communication cells in parallel.

7. The communication interface of claim 3, wherein the unidirectional synchronous receive bus has multiple lanes for transporting the first communication cells in parallel.

8. The communication interface of claim 3, further comprising circuitry that permits (a) a transfer of the second communication cells concurrently over multiple lanes of the unidirectional synchronous transmit bus and (b) a transfer of the first communication cells concurrently over multiple lanes of the unidirectional synchronous receive bus.

* * * * *